United States Patent
Fischer (10) Patent No.: US 12,320,697 B1
(45) Date of Patent: Jun. 3, 2025

(54) BEAM ALIGNMENT SYSTEM

(71) Applicant: Northrop Grumman Systems Corporation, Falls Church, VA (US)

(72) Inventor: Gerald R. Fischer, Redondo Beach, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 0 days.

(21) Appl. No.: 18/909,264

(22) Filed: Oct. 8, 2024

(51) Int. Cl.
| | |
|---|---|
| *G01J 1/42* | (2006.01) |
| *G01J 1/02* | (2006.01) |
| *G01J 1/04* | (2006.01) |
| *G01S 5/02* | (2010.01) |

(52) U.S. Cl.
CPC ........... *G01J 1/4257* (2013.01); *G01J 1/0266* (2013.01); *G01J 1/0403* (2013.01); *G01S 5/021* (2013.01); *G01S 5/02213* (2020.05)

(58) Field of Classification Search
CPC ...... G01J 1/4257; G01J 1/0266; G01J 1/0403; G01S 5/021; G01S 5/02213
See application file for complete search history.

(56) References Cited

U.S. PATENT DOCUMENTS

| | | | | |
|---|---|---|---|---|
| 4,867,560 A | * | 9/1989 | Kunitsugu | H04B 10/118 356/139.05 |
| 6,178,024 B1 | * | 1/2001 | Degura | H04B 10/1125 398/119 |
| 2012/0249366 A1 | * | 10/2012 | Pozgay | H04B 7/18571 342/354 |

FOREIGN PATENT DOCUMENTS

EP    0 287 032 B1    2/1996

OTHER PUBLICATIONS

Grinch, Dean S., et al., Laser System for Cooperative Pointing & Tracking of Moving Terminals over Long Distance, Proc. of SPIE vol. 6238, 623803, (2006); 12 pages.

* cited by examiner

*Primary Examiner* — Charles Cai
(74) *Attorney, Agent, or Firm* — KLINTWORTH & ROZENBLAT IP LLP (57) ABSTRACT

An exemplary beam alignment system uses beam sensors that generate electrical signals corresponding to an amount of beam striking each sensor. An offset correction circuit determines an amount of undesired beam striking the sensors. The offset correction circuit subtracts the undesired beam value from each of the electrical signals to generate respective corrected values. X and Y signals, generated based on the corrected values, determine an X-axis and Y-axis location of the beam on the beam sensors. Position control signals, generated based on the X and Y signals, control the position of the beam relative to the sensors resulting in a corresponding X-axis and Y-axis location of the beam on the sensors. This provides compensation for changes in orientation of the incoming beam relative to the sensors to maintain the beam location on the sensors.

14 Claims, 6 Drawing Sheets

BEAM ALIGNMENT SYSTEM

FIELD OF DISCLOSURE

The present subject matter relates to the field of beam tracking between two devices where at least one of the devices may be in motion relative to the other device. The present subject matter more specifically relates to the tracking of an optical or RF beam and providing adjustments so that the receive aperture and sensors on the receiving device remain pointed toward the incoming beam even though the position of at least one of the transmitting and receiving devices may be changing.

BACKGROUND

Beam tracking systems often use sensors that cannot discriminate between the desired signal and background or other extraneous sources of power. Determining the pointing error relies on an accurate determination of the relative changes in signal power of the desired signal. The presence of extraneous power, i.e. power that is not part of the desired signal, causes inaccuracies by altering the apparent nominal power upon which the relative change estimates are based. Low-frequency amplitude modulation (AM) may be modulated on the signal, e.g. light beam, to assist in distinguishing the desired signal from the other sources of extraneous power. Typical techniques for the detection of the AM modulation limit the rate of making power estimates to once per cycle of the AM modulation frequency. If the AM frequency is relatively low, control systems used to adjust sensor pointing will suffer from insufficient sample rate to perform rapid control, such as during a pointing disturbance.

Communication pointing systems that utilize low-frequency AM for desired signal identification may have to resort to the transmission of a separate additional colinear light beam and a corresponding additional tracking sensor that has sufficient sample rates to support more rapid pointing determinations. It will be apparent that utilizing additional beams and tracking sensors is undesirable from the perspectives of cost, additional hardware, increased power consumption, and reliability.

SUMMARY

It is an object of the present subject matter to process signals from beam sensors so that corrected output signals represent only the signal of interest as distinguished from extraneous other light/signals present at the sensor.

An exemplary beam alignment system uses beam sensors that provide a plurality of electrical signals with values that correspond to an amount of the beam striking each sensor. An offset correction circuit determines a first portion of the electrical signals that represents an amount of offset beam striking the sensors, where the offset beam is a beam not part of the desired incoming beam. The offset correction circuit subtracts the first portion from the values of each of the electrical signals to generate respective corrected values of each of the electrical signals. X and Y signals are generated based on the corrected values, where the X and Y signals determine an X-axis and Y-axis location on the sensors where the incoming beam strikes. Position control signals are generated based respectively on the X and Y signals, where the position control signals control the position where the incoming beam strikes the sensors resulting in a corresponding X-axis and Y-axis location on the sensors where the incoming beam strikes. This alignment system compensates for changes in orientation of the incoming beam relative to the sensors to maintain the location on the sensors where the incoming beam strikes.

An exemplary method consistent with the operation of the beam alignment system as described is also part of the subject matter.

DETAILED DESCRIPTION

The exemplary optical tracking system in accordance with the present subject matter may be advantageously applied in various systems for maintaining the receive pointing for reception of an optical beam from a laser or other generation source. It includes providing improved error correction information to the position control device that maintains pointing of the received light beam on the optical sensor. The present subject matter is especially, but not exclusively, suited for use in an optical communication system such as between satellites or between a satellite and an earth station which utilizes a light beam for the transmission of information therebetween.

One aspect of the present subject matter resides in the generation of improved position correction/error signals which more accurately and rapidly represent the true position of the received beam with less influence from other undesired sources of power. This results in an improved ability to maintain pointing of the received beam on the corresponding sensors.

Figure 1:
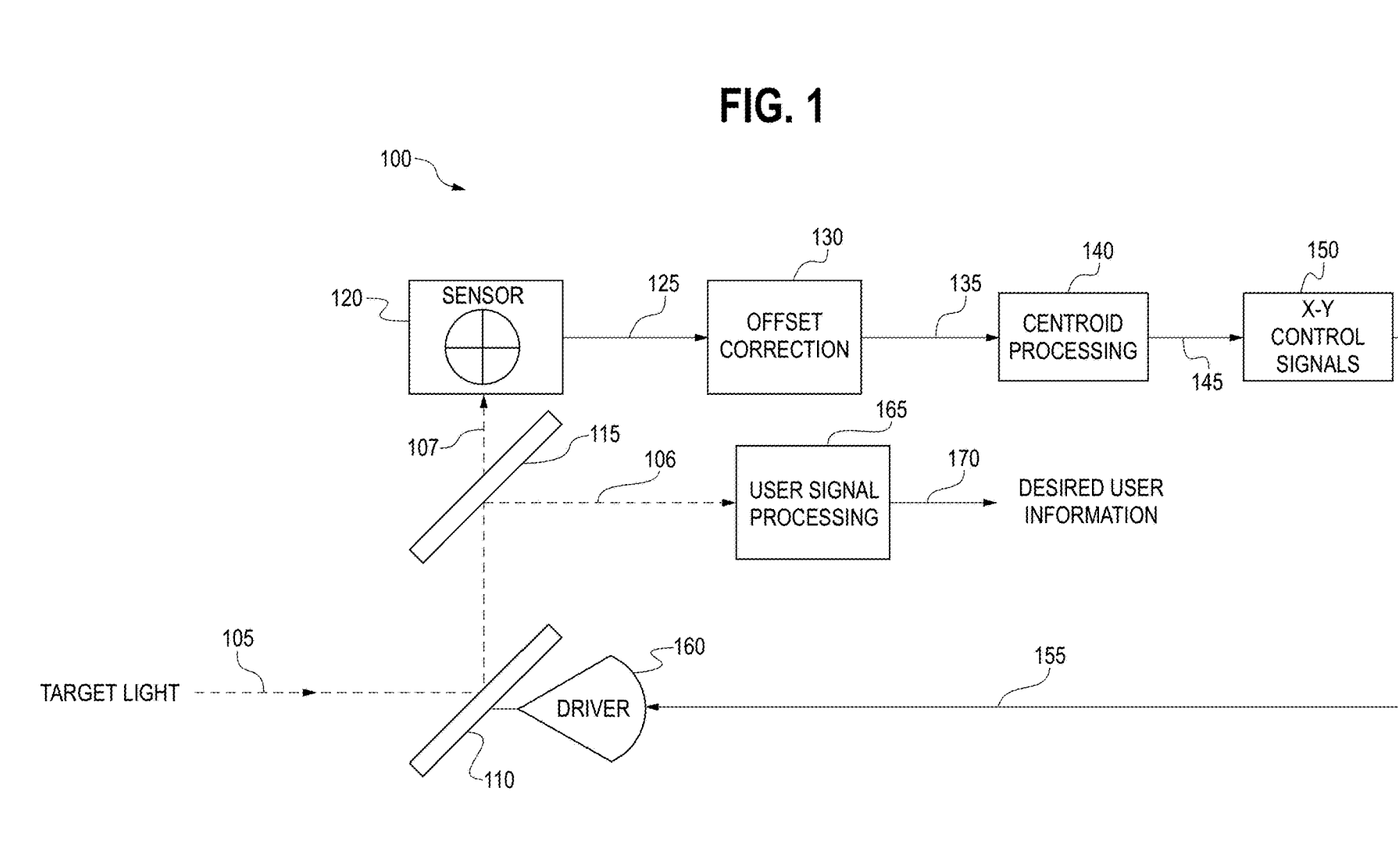
FIG. 1 is a block diagram of an exemplary optical system in accordance with the present subject matter.

FIG. 1 shows a block diagram 100 of an exemplary optical system in accordance with the present subject matter. A target light 105, e.g. a beam from a laser, strikes an adjustable position mirror 110 such as an electromechanical or piezoelectric mirror with controllable positioning. The light 105 as reflected from mirror 110 strikes a splitter 115 which reflects a portion 106 of the light in one direction while permitting another portion 107 of light 105 to pass through the splitter 115. An optical sensor 120, e.g. a quad cell sensor, receives light 107 with each of the sensor cells generating an electrical output representative of the power of light striking the respective cell sensor. For example, if an equal amount of light 107 struck each of the cell sensors in a common plane, the respective electrical outputs would have an equal value. Generally, the total area of the sensors is larger than the cross-sectional area of the beam so that movement of the beam from the center of the sensor group will result in the individual sensors generating unequal output values.

The outputs 125 from sensor 120 are received as inputs by an offset correction circuit 130 which will be described in more detail in FIG. 2. The objective of the output correction circuit 130 is to generate signals 135 corresponding to the outputs of the cell sensors that are more effective for determining X-Y mirror positioning than the unprocessed signals direct from the cell sensors. Signals 135 are processed by a centroid processing circuit 140, described in more detail in FIG. 3, which generates X-axis and Y-axis signals 145 representative of the position of the beam relative to the center of the optical sensor 120. Signals 145 are processed by the X-Y control signal circuitry 150 which translates the signals 145 into corresponding electrical values 155 required by driver 160 to provide corresponding X-Y axis error correction adjustments of mirror 110 to maintain the optical beam nominally aligned with the center of sensor 120. Those skilled in the art will appreciate that the combined elements of diagram 100, except elements 115 and 165, form a feedback control system in which circuitry 150 implements the control algorithm, for example a Proportional-Integral-Derivative (PID) algorithm, which provides the change required by driver 160 to cause a corresponding position change of mirror 110 to point the beam 105 so that the beam portion 107 is adjusted to more nearly strike the center of sensor 120.

The reflected portion 106 of the beam 105 is received as an input by a user signal processing circuit 165 that derives, e.g. demodulates, the information encoded on light beam 105. Those skilled in the art will appreciate that the specific circuitry 165 will depend upon the type of encoding/modulation utilized to originally encode the user information onto the light beam 105. Various types of such circuitry are generally known.

Figure 2:
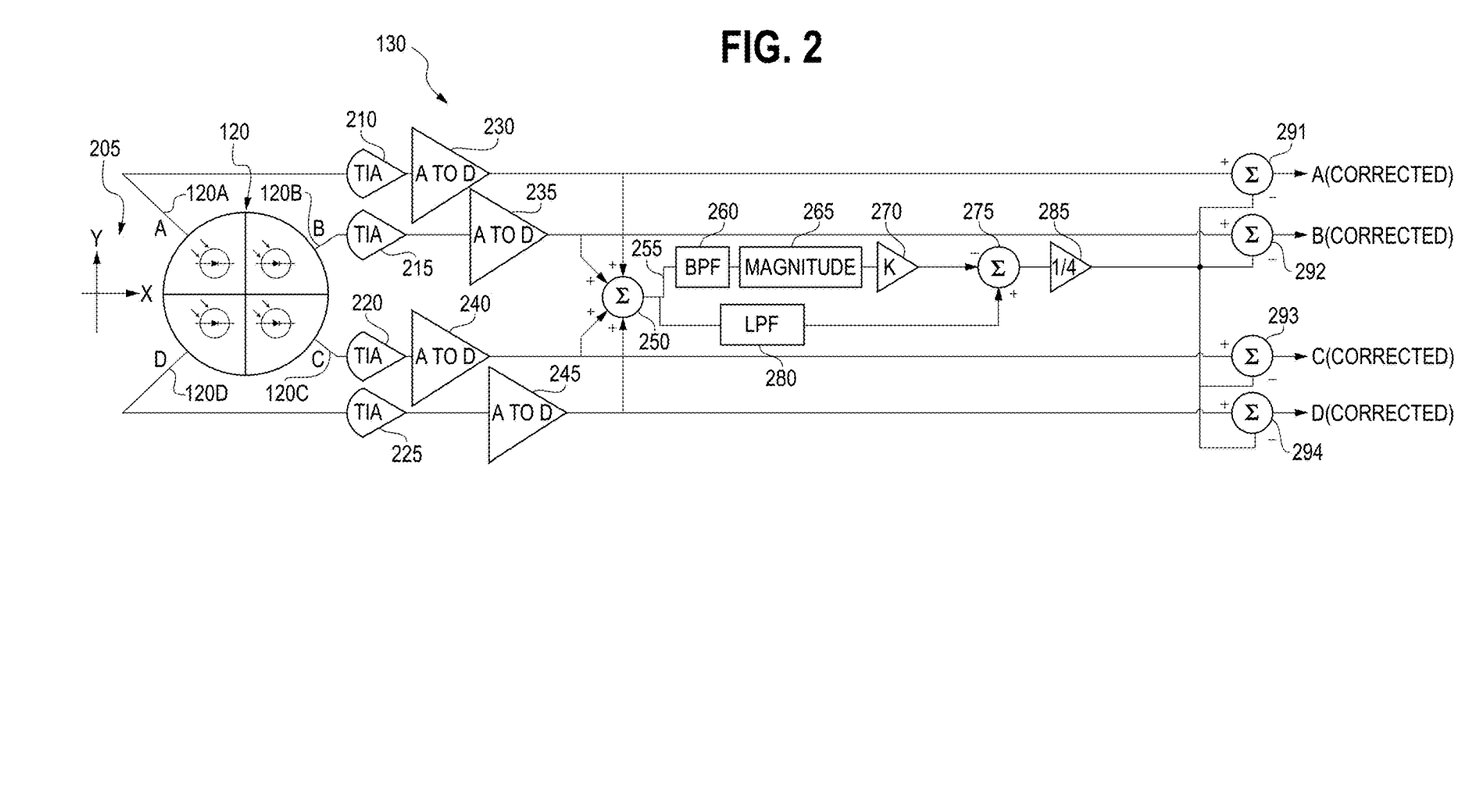
FIG. 2 is a block diagram of an exemplary offset correction block and sensor as shown in FIG. 1.

FIG. 2 shows a block diagram of an exemplary offset correction circuitry 130 and sensor 120, both as shown in FIG. 1. In this illustrative example, sensor 120 contains 4 individual optical photodiode sensors A, B, C and D arranged in respective quadrants as shown. The orientation of these quadrants relative to the beam 107 is shown by the illustrated Y and X axis coordinate system 205 with 0, 0 X and Y values corresponding to the center of the sensor 120 at the intersection of the 4 quadrants. Transimpedance amplifiers (TIA) 210, 215, 220 and 225 receive the respective outputs 120A, 120B, 120C and 120D from sensors A, B, C and D, and provide amplified respective output signals to analog to digital (AtoD) converters 230, 235, 240 and 245, respectively. Although the use of 4 optical sensors is described in this illustrative example, different numbers of optical sensors could be utilized in accordance with the improvements offered by the present subject matter.

The outputs of all of the AtoD converters are summed by a digital summation circuit 250 which provides a summed output 250 that serves an input to the bandpass filter (BPF) 260. In the illustrated example, low-frequency AM modulation, e.g. 10% amplitude modulation at 5 kHz, is encoded on the optical beam to act as an identifier to assist in distinguishing the desired signal from undesired signals/background light striking the sensor that are assumed not to contain such modulation. The bandpass filter 260 has a narrow passband centered on the frequency of the AM modulation and provides an output signal representative of the AM modulation. The magnitude circuit 265 determines the magnitude of the AM modulation and provides this value to a fixed gain block 270 with the gain of "K" that converts the magnitude, e.g. 10%, to be the full value, 100%, of the signal where the original AM modulation is known to be a fixed fraction 1/K of the total signal magnitude. Thus, the output of fixed gain block 270 provides an estimate of the signal magnitude.

The output 255 from the summation circuit 250 also provides an input to a low-pass filter (LPF) 280 that provides a longer-term average representing the total magnitude of the desired signal as well as any undesired signals/background light (referred to as an "offset") as sensed by sensor 120. This output from the low-pass filter 280 provides an input to the subtraction circuit 275 which also receives the output of fixed gain block 270 (the signal value) as an input. Thus, the output from subtraction circuit 275 represents the "offset" or magnitude of the undesired values. Because four separate signals have been combined, fixed gain block 285 has a gain of 1/R (where R is the number of sensors, e.g 4 in this example) to adjust the magnitude of the offset so that it can be individually combined with each of the four signals at the appropriate magnitude. Subtraction circuits 291, 292, 293 and 294 receive as inputs the respective outputs from the AtoD converters 230, 235, 240 and 245 from which is subtracted the offset signal magnitude from fixed gain 285 resulting in corrected values of A (120A), B (120B), C (120C) and D (120D) where these values minimize any offset (undesired signal components).

Figure 3:
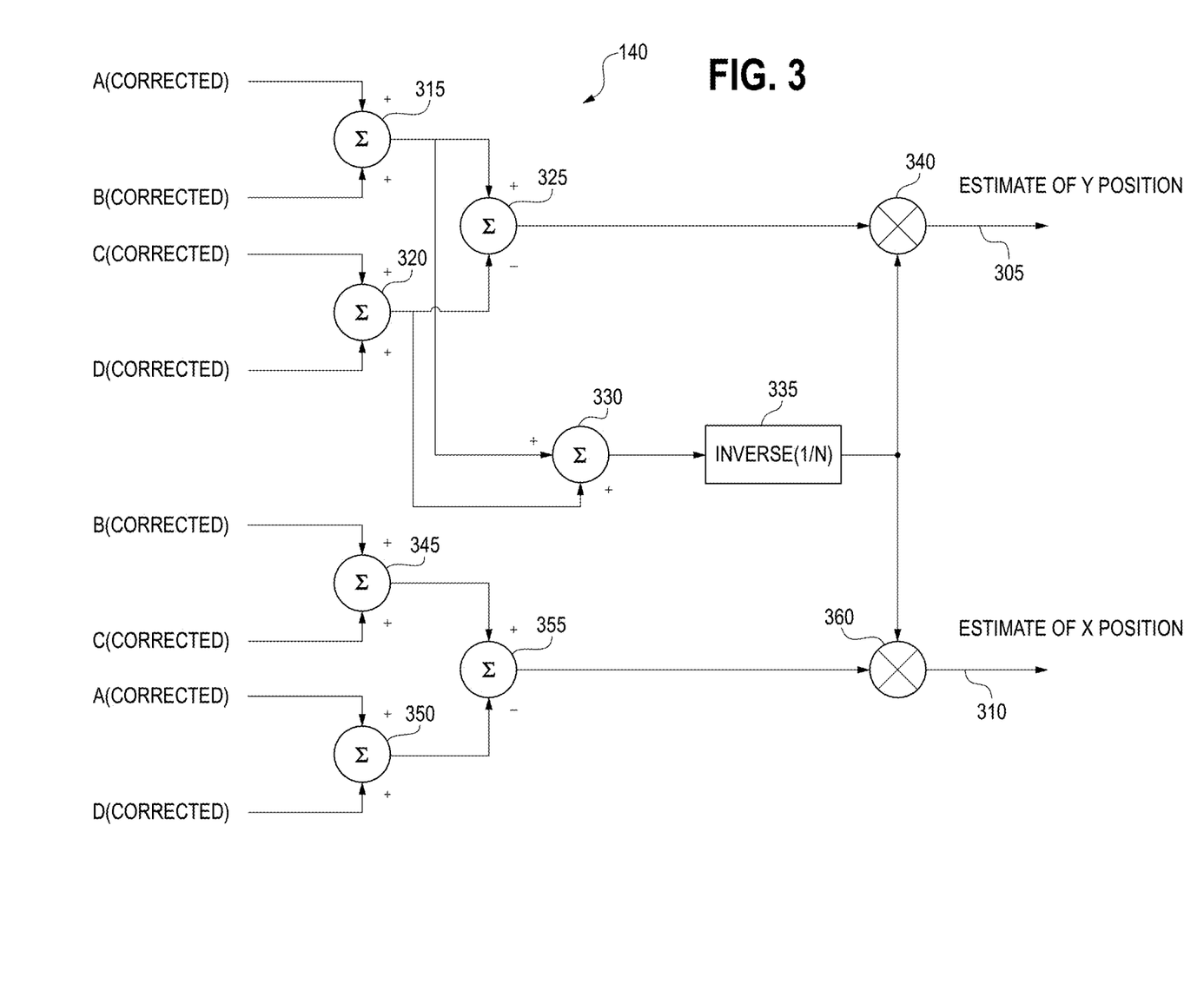
FIG. 3 is a block diagram of an exemplary centroid processing block as shown in FIG. 1.

FIG. 3 shows a block diagram of an exemplary centroid processing circuit 140 as shown in FIG. 1. The objective of centroid processing circuit 140 is to generate a signal 305 that provides an estimate of the Y-axis position of the beam relative to the sensor 120 and a signal 310 that is an estimate of the X-axis position of the beam relative to the sensor 120. As seen, corrected A, B, C and D signals as shown in FIG. 2 provide inputs to a plurality of summation circuits.

Summation circuit 315 receives corrected signals A and B as inputs, and summation circuit 320 receives corrected signals C and D as inputs. Subtraction circuit 325 subtracts the output from circuit 320 from the output of circuit 315. The outputs of summation circuits 315 and 320 provide inputs to summation circuit 330 so that the output of circuit 330 is the cumulative total of corrected signals A, B, C and D. This cumulative total is an input to inverse circuit 335 which serves to divide/reduce the magnitude by providing a normalization factor (N) to remove position dependence on signal level and AM level by dividing by the total signal. The output of circuit 335 provides one input to multiplier circuit 340 which receives the output of the subtraction circuit 325 as its other input. The output signal 305 from multiplier 340 is an estimate of the Y position.

Summation circuit 345 receives corrected signals B and C as inputs, and summation circuit 350 receives corrected signals A and D as inputs. Subtraction circuit 355 subtracts the output from summation circuit 350 from the output of summation circuit 345. The output of subtraction circuit 355 provides an input to multiplication circuit 360 which also receives the output from circuit 355 as an input to provide normalization. The output signal 310 of multiplication circuit 360 is an estimate of the X position of the beam relative to the center of the sensor 120.

Figure 4:
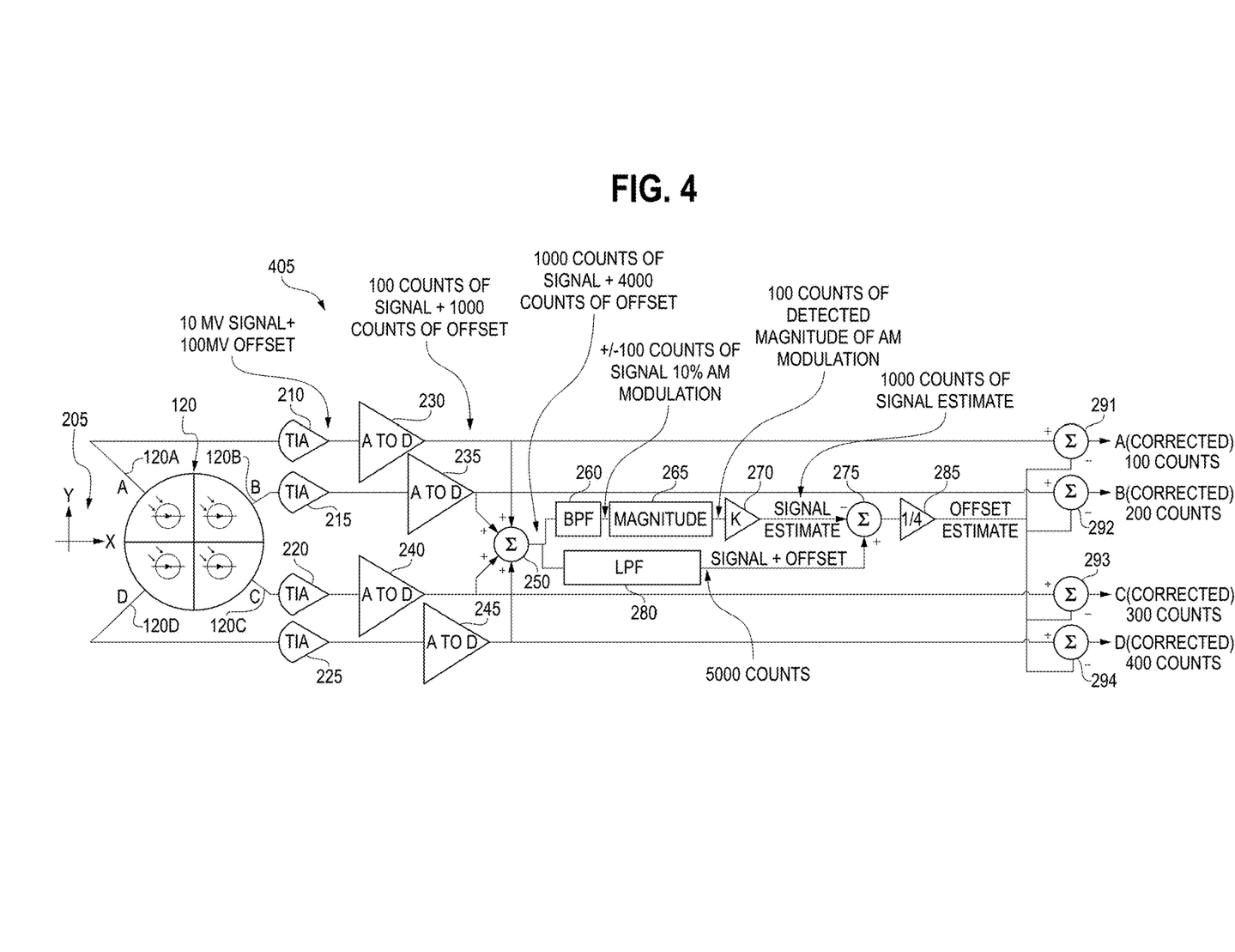
FIG. 4 shows the block diagram of FIG. 2 with exemplary values.

FIG. 4 shows the block diagram of FIG. 2 with exemplary values to aid in understanding the present subject matter. The same reference numerals are used in FIG. 4 to identify corresponding elements as shown in FIG. 2. The offset correction circuit 405 corresponds to the offset correction circuit 130 of FIG. 2. In this illustrative example, assume the following: the gain of each of the TIAs is 100,000,000 ohms; the least significant bit of each of the AtoDs is 0.1 mV; the amount of AM modulation on the desired signal is ±10%; and the gain K of fixed gain block 270 is 10.

For this example, Table 1 shows for each quadrant the amount of light striking each of the sensors A, B, C, D and the responsive currents generated.

TABLE 1

| Quadrant | Magnitude of arriving signal light | Signal current corresponding to the arriving signal light | Offset current due to other light sources |
|---|---|---|---|
| A | 100 pW | 100 pA | 1000 pA |
| B | 200 pW | 200 pA | 1000 pA |
| C | 300 pW | 300 pA | 1000 pA |
| C | 400 pW | 400 pA | 1000 pA |

It will be noted that the value of the offset current for each of the quadrant sensors is the same value, i.e. 1000 picoamperes (pA), since it is assumed that the same amount of offset light is striking each of the sensors. The output of amplifier 210 is shown to be 10 mV of signal plus 100 mV due to the offset light. Similarly, the output of amplifiers 215, 220 and 225 is 20 mV, 30 mV and 40 mV representative of the desired signal plus each having 100 mV representing the offset magnitude of the undesired light.

The output of AtoD converter 230 is shown to be 100 counts corresponding to the desired signal plus 1000 counts representing the offset. The outputs of AtoD converters 235, 240 and 245 will be understood to be 200, 300 and 400 counts respectively representing the desired signal plus each having 1000 counts representing the offset. As shown, the output of summation circuit 250 will be the summation of these respective for digital signals; 1000 counts representing the total of the desired signals plus 4000 counts representing the total of the offset. Since the AM modulation is assumed to be 10% and the purpose of the bandpass filter is to effectively detect the amount of modulation, the output from bandpass filter 260 will be 10% of the 1000 counts of the desired signal, i.e. 100 counts. This signal is multiplied by fixed gain block 270 to generate a value representative of the desired signal itself. Since the AM modulation level was 10%, the amplification factor K would be 10 to recover the signal itself (1000) as shown at the output of fixed gain block 270.

The output of the low-pass filter 280 serves to provide a longer-term average resulting in 1000 (desired signal counts)+4000 (offset counts) equaling a result of 5000 total counts representing the signal plus the offset. The subtraction circuit 275 subtracts the 1000 counts associated with the desired signal from the 5000 counts representing the total signal resulting in an output of 4000 counts. At this stage, the 4000 counts are representative of the total offset. Fixed gain block 285 reduces the 4000-count value of the offset by ¼ resulting in 1000 counts in order to scale the amount of offset that should be associated with each of the four quadrants. This value provides an input to each of the subtraction circuits 291, 292, 293 and 294 in order to subtract the value of the offset from the respective outputs of AtoD converters 230, 235, 240 and 245. Thus, the outputs of subtraction circuits 291, 292, 293 and 294 provide corrected quadrant signals for A, B, C and D of 100, 200, 300 and 400 counts, respectively.

Figure 5:
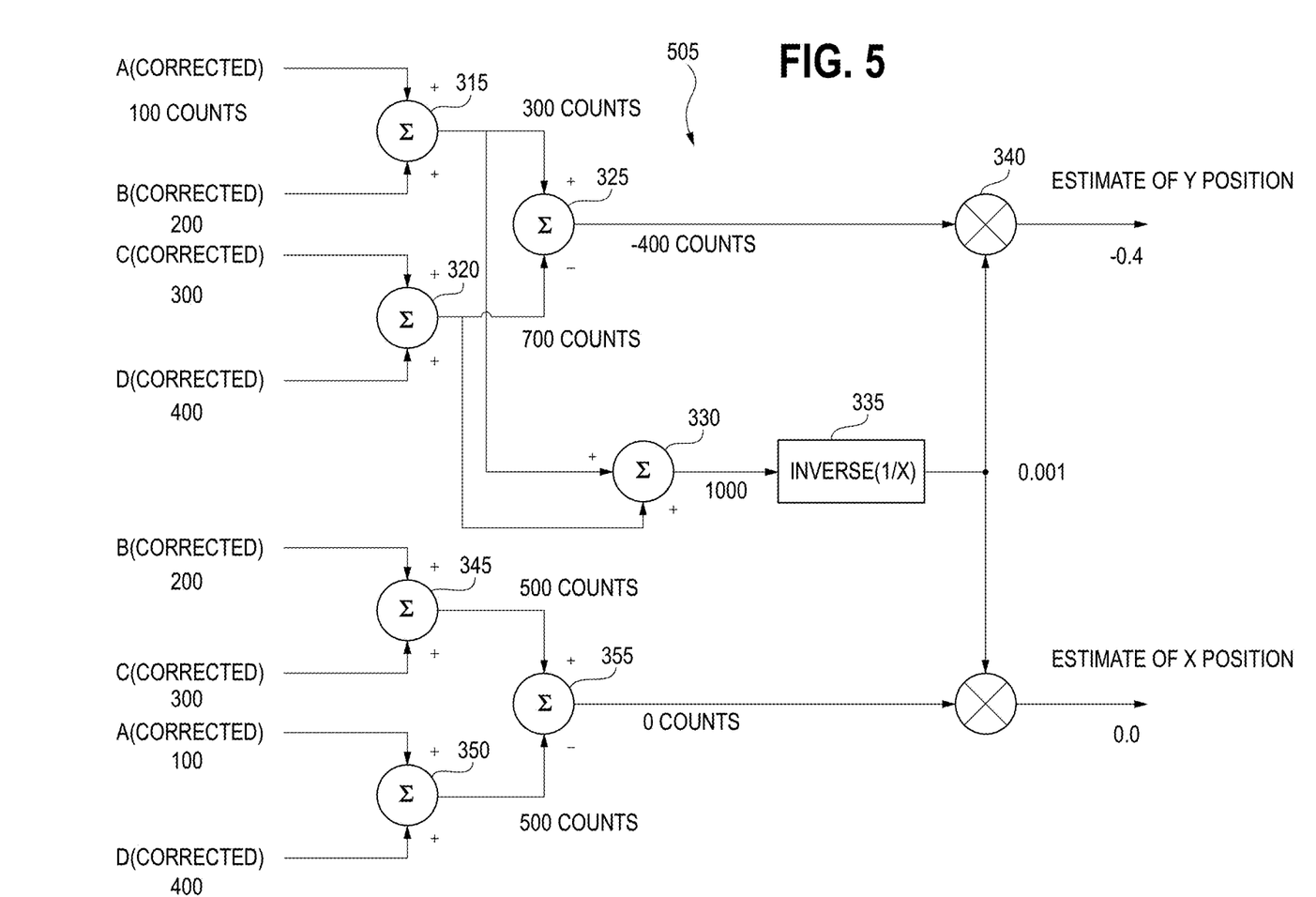
FIG. 5 shows a block diagram of FIG. 3 with exemplary values.

FIG. 5 shows the block diagram of FIG. 3 with exemplary values to aid in understanding the present subject matter. The same reference numerals are used in FIG. 5 to identify corresponding elements as first shown in FIG. 3. The centroid processing circuit 505 corresponds to the centroid processing circuit 140 of FIG. 3. As will be seen, the corrected outputs from the upper hemisphere sensors (A, B) are subtracted from those of the lower hemisphere sensors (C, D) to form a Y axis position; the corrected outputs from the right hemisphere sensors (B, C) are subtracted from those of the left hemisphere sensors (A, D) to form an X axis position. It will be noted that the output of subtraction circuit 355 is zero counts indicating that the light beam is substantially centered relative to the sensor 120 in the X direction. The minus 400 counts at the output of subtraction circuit 325 indicates that more light is falling on the lower hemisphere and results in a Y position estimate of −0.4 at the output of multiplier 340. Referring to FIG. 1, these values will be utilized by the X-Y control signal circuit 150 to generate a corresponding voltage that will be utilized by the driver 160 to cause an adjustment of mirror 110 so that the direction of the target light 105 is changed to cause more of the light beam to strike the upper hemisphere of sensors and less of the light beam to strike the lower hemisphere of sensors. The control signal circuit 150 will employ a feedback control system algorithm, such as Proportional-Integral-Derivative (PID) algorithms which are well known to those skilled in the art, to continuously adjust the drive signal 155 to maintain a mirror position so that the incoming beam will strike the center of the sensor 120. Those skilled in the art will appreciate that the offset correction circuit 130 provides error signals that more accurately reflect the relative signal strength, and therefore motion, with less influence from undesired background powers, thus enabling a more reliable and predictable control system without control system gain variation that might occur due to variation in undesired background powers. Furthermore, the offset correction circuit 130 has allowed the error information available in sensor 120 to reach the control signal circuit 150 without waiting for a full cycle of the AM modulation to be detected, thus enabling a higher bandwidth control system that can more readily mitigate rapid motion of the transmitter or receiver.

Figure 6:
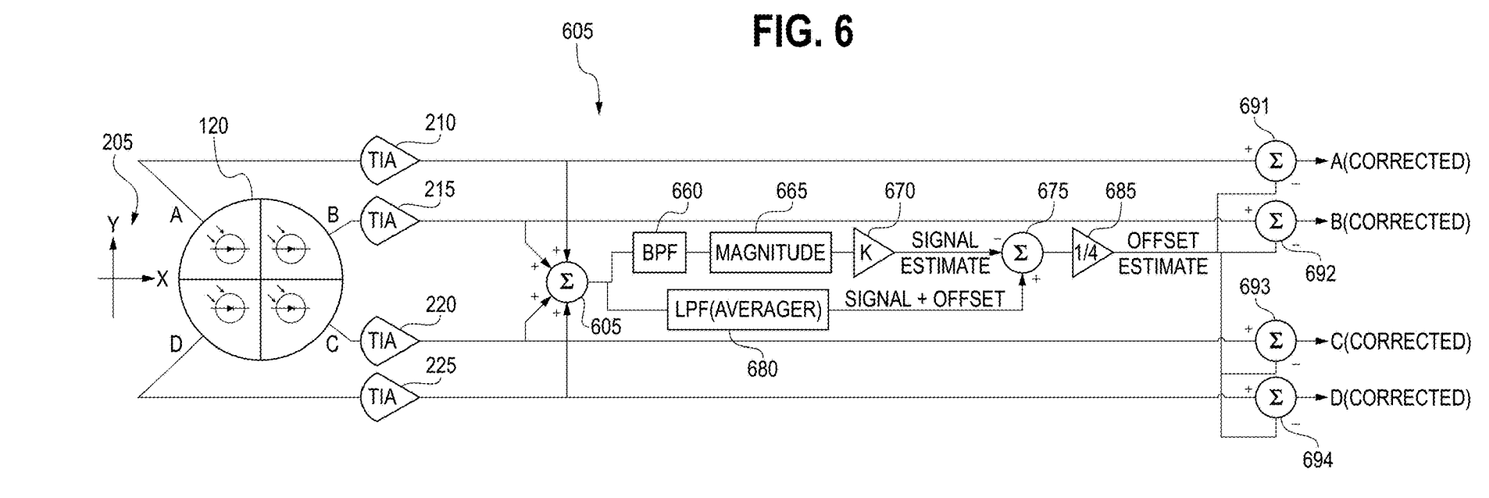
FIG. 6 is a block diagram of an alternative exemplary offset correction block as shown in FIG. 1.

FIG. 6 shows a block diagram of an alternative exemplary offset correction circuit 605 using light sensor 120. The offset correction circuit 605 is similar to that shown in FIG. 2 except that it operates as an analog implementation. Thus, the analog voltage outputs from amplifiers 210, 215, 220 and 225 are summed by summation circuit 605. Similarly, the bandpass filter 660, magnitude circuit 665, amplifier 670 and low-pass filter 680 provide a similar function to that explained for elements 260, 265, 270 and 280 except that an analog implementation of the same functions is utilized. Subtraction circuit 675 and amplifier 685 likewise provide a corresponding function as previously explained for similar elements except in the analog domain. And finally, the subtraction circuits 691, 692, 693 and 694 operate as previously explained for FIG. 2 except that they operate on analog inputs as opposed to digital inputs and provide analog output voltages.

Although the preceding examples of embodiments have described the location tracking in terms of tracking a beam of light, a radio frequency (RF) beam could also be tracked and benefit from the described tracking improvements. For example, instead of light sensor 120, a parabolic antenna system with four separate internal antennas spaced apart about the normal foci of the parabolic dish could be utilized to distinguish RF signal levels. An additional antenna located at the foci of the parabolic dish could be utilized to provide a signal from which the desired user information would be derived. Four corresponding RF signals would be carried by waveguides or coaxial cables to four corresponding RF level detectors, each having an output coupled to a respective analog-to-digital converter, e.g. similar to 230, 235, 240, 245. Similarly, the output from the additional antenna would serve as an input to a user signal processing circuit (similar to circuit 165) from which the desired user information would be recovered. Processing of the information from the outputs of the analog-to-digital converters would be the same as previously described for the light beam embodiments. However, in the RF embodiment, a driver, e.g. similar to 160, would be coupled to the parabolic antenna system having an adjustable orientation controlled by X-Y control information provided by the driver. Thus, the X-Y control signals from driver would cause adjustments to the orientation of the parabolic antenna system in order to keep the parabolic dish centered about the incoming RF beam and maximizing the signal level to the additional antenna.

Various changes and substitutions can be made to the exemplary embodiments of the present subject matter while keeping within the scope of the subject matter. For example, the digital portion of the system explained for FIGS. 2-5 could be implemented by a microprocessor system that processes the information from the AtoD converters and implements the functions in software.

What is claimed is:

1. A beam alignment system comprising:
   beam sensors that provide a plurality of electrical signals with values that correspond to an amount of an incoming beam striking each sensor;
   means for adjusting an orientation of the incoming beam relative to the beam sensors;
   an offset correction circuit includes a summation circuit that sums all the electrical signals to produce a summed signal, the offset correction circuit derives from the summed signal a desired signal and a total signal representing a combined value of all the electrical signals;
   the offset correction circuit, based on the desired signal and the total signal, generating an offset signal that represents a first portion of the total signal that is other than the desired signal, the offset correction circuit subtracting the first portion from the values of each of the electrical signals to generate respective corrected values for each of the electrical signals;
   location circuitry generates X and Y signals based on the corrected values where the X and Y signals determine a respective X-axis and Y-axis location on the beam sensors where the incoming beam strikes the beam sensors;
   control circuitry generates position control signals based respectively on the X and Y signals where the position control signals are used by the adjusting means to control the orientation of the incoming beam relative to the beam sensors to compensate for changes in orientation of the incoming beam relative to the beam sensors to maintain a centered location on the beam sensors where the incoming beam strikes.

2. The beam alignment system of claim 1 wherein the incoming beam includes an amount of amplitude modulation.

3. The beam alignment system of claim 2 wherein the offset correction circuit comprises:
   means for determining an average of the summed signal;
   means for determining an amplitude modulation (AM) portion of the summed signal that is associated with the amplitude modulation;
   means for generating a first value representing the amount of incoming light beam based on the AM portion;
   means for subtracting the first value from the average of the summed signal to produce a resultant signal representative of the amount of offset signal and generating a scaled version of the resultant signal proportioned for each of the electrical signals;
   means for subtracting the scaled version of the resultant signal from each of the electrical signals to produce the respective corrected values.

4. The beam alignment system of claim 3 wherein the scaled version of the resultant signal is proportioned based on the number of beam sensors.

5. The beam alignment system of claim 1 wherein the location circuitry generates the X and Y signals that are normalized relative to the total of the desired signal.

6. The beam alignment system of claim 1 wherein:
   the incoming beam is a light beam;
   the beam sensors are optical sensors;
   the adjusting means includes an electromechanical adjustably positioned mirror upon which the light beam is reflected towards the optical sensors; and
   the adjusting means includes an electrical drive circuit to which the position control signals are coupled for controlling the position of the mirror.

7. The beam alignment system of claim 1 wherein:
   the incoming beam is an RF beam;
   the beam sensors are separate antennae or antennae feeds;
   the adjusting means includes an electromechanical adjustably positioned antenna system for receiving the RF beam; and
   the adjusting means includes an electrical drive circuit to which the position control signals are coupled for controlling the orientation of the antenna system.

8. A method for maintaining alignment of an incoming beam relative to a plurality of beam sensors where the orientation of the incoming beam relative to the beam sensors is subject to change, the beam sensors provide a plurality of electrical signals with values that correspond to an amount of the incoming beam striking each beam sensor, the method comprising the steps of;
   determining by an offset correction circuit; a summed signal representing the summation of all of the electrical signals; a desired signal derived from the summed signal; and a tool signal representing a combined value of all the electrical signals;
   also determined by the offset correction circuit, based on the desired signal and the total signal, a first portion of the electrical signals that represents an amount of offset beam striking the beam sensors where the offset beam is a beam not part of the incoming beam;
   subtracting the first portion from the values of each of the electrical signals to generate respective corrected values of each of the electrical signals;
   generating X and Y signals based on the corrected values where the X and Y signals determine an X-axis and Y-axis location on the beams sensors where the incoming beam is striking;
   generating position control signals based respectively on the X and Y signals where the position control signals define a corresponding X-axis and Y-axis location of the incoming beam on the beam sensors to compensate for changes in orientation of the incoming beam relative to the beam sensors to maintain a location on the beam sensors where the incoming beam strikes.

9. The method of claim 8 wherein the incoming beam includes an amount of amplitude modulation.

10. The method of claim 9 wherein the offset correction circuit comprises:
    determining an average of the summed signal;
    determining an amplitude modulation (AM) portion of the summed signal that is associated with the amplitude modulation;

generating a first value representing the amount of incoming light beam based on the AM portion;

subtracting the first value from the average of the summed signal to produce a resultant signal representative of the amount of offset beam and generating a scaled version of the resultant signal proportioned for each of the electrical signals;

subtracting the scaled version of the resultant signal from each of the electrical signals to produce the respective corrected signals.

11. The method of claim 10 wherein the scaled version of the resultant signal is proportioned based on the number of beam sensors.

12. The method of claim 8 wherein the generating X and Y signals generates the X and Y signals that are normalized relative to the total of the desired signal.

13. The method of claim 8 comprising:
the incoming beam is a light beam;
the beam sensors are optical sensors; and
controlling, based on the position control signals, an electromechanical adjustably positioned mirror upon which the light beam is reflected towards the optical sensors.

14. The method of claim 8 comprising:
the incoming beam is an RF beam;
the beam sensors are separate antennae;
controlling an electromechanical adjustably positioned antenna system for receiving the RF beam by an electrical drive circuit to which the position control signals are coupled for controlling the orientation of the antenna system.

* * * * *

UNITED STATES PATENT AND TRADEMARK OFFICE
CERTIFICATE OF CORRECTION

PATENT NO. : 12,320,697 B1
APPLICATION NO. : 18/909264
DATED : June 3, 2025
INVENTOR(S) : Fischer Page 1 of 1

It is certified that error appears in the above-identified patent and that said Letters Patent is hereby corrected as shown below:

In the Claims

Column 8, Claim 8, Line 39 please delete "tool" and substitute --total--.

Signed and Sealed this
Eighth Day of July, 2025

Coke Morgan Stewart
*Acting Director of the United States Patent and Trademark Office*